(12) United States Patent
Hays et al.

(10) Patent No.: US 9,430,294 B2
(45) Date of Patent: Aug. 30, 2016

(54) ELASTIC MANAGEMENT FRAMEWORK

(75) Inventors: Boyd Leon Hays, Kirkland, WA (US); Mohamed E. Fathalla, Sammamish, WA (US); Charles Joseph Williams, Bothell, WA (US); Suyash Sinha, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1046 days.

(21) Appl. No.: 12/887,512

(22) Filed: Sep. 22, 2010

(65) Prior Publication Data

US 2012/0072480 A1    Mar. 22, 2012

(51) Int. Cl.
*G06F 15/16* (2006.01)
*G06F 9/50* (2006.01)

(52) U.S. Cl.
CPC .................... *G06F 9/5061* (2013.01)

(58) Field of Classification Search
CPC ....................................................... G06F 9/5061
USPC ....................................................... 709/202
See application file for complete search history.

(56) References Cited

U.S. PATENT DOCUMENTS

| | | | |
|---|---|---|---|
| 2007/0067409 A1* | 3/2007 | Eslambolchi et al. | 709/217 |
| 2009/0327457 A1 | 12/2009 | Lees et al. | |
| 2011/0060895 A1* | 3/2011 | Solomon | 713/1 |

FOREIGN PATENT DOCUMENTS

WO    2009130606 A2    10/2009

OTHER PUBLICATIONS

Elmroth, et al., "Accounting and Billing for Federated Cloud Infrastructures", Retrieved at << http://www8.cs.umu.se/~elmroth/papers/eghp_gcc2009.pdf >>, Proceedings of the 2009 Eighth International Conference on Grid and Cooperative Computing, Aug. 27-29, 2009, pp. 1-8.

Singh, et al., "Autonomic Mix-Aware Provisioning for Non-Stationary Data Center Workloads—Published Date: 2010", Retrieved at << http://none.cs.umass.edu/papers/pdf/icac2010.pdf >>, Proceeding of the 7th international conference on Autonomic computing, Jun. 7-11, 2010, pp. 1-10.

Aguiar, et al., "A tool to simplify the management of homogeneous and heterogeneous grids", Retrieved at << http://ieeexplore.ieee.org/stamp/stamp.jsp?arnumber=05202310 >>, Aug. 18, 2009, pp. 295-298.

"Amazon Elastic Compute Cloud (Amazon EC2)", Retrieved at << http://aws.amazon.com/ec2/ >>, retrieved date; Jun. 18, 2010, pp. 1-8.

"Enomaly Elastic Computing Platform (ECP) Version 3", Retrieved at << http://www.enomaly.com/Products.products.0.html >>, retrieved date: Jun. 18, 2010, pp. 1-2.

* cited by examiner

*Primary Examiner* — Suraj Joshi (74) *Attorney, Agent, or Firm* — John Jardine; Judy Yee; Micky Minhas (57) ABSTRACT

A framework for building an adaptive management system is described herein. Tools for building customized Agents that communicate by way of an interface abstraction over many mediated and non-mediated communications channels are described herein, wherein such tools allow for the Agents to be decoupled in terms of at least one of space, time, transport, synchronization, or communications direction.

20 Claims, 9 Drawing Sheets

ELASTIC MANAGEMENT FRAMEWORK

BACKGROUND

Computing technology has advanced such that today's computers can undertake complex computations at relatively high speeds. There is, of course, no one single computer with sufficient computing resources to undertake all requested computing tasks at a single moment in time. Accordingly, computers have been configured to execute cooperatively and in parallel to perform large computational tasks. In an example, data centers include a plurality of computing devices that are configured to cooperatively execute to achieve a particular task. Thus, multiple computers are frequently purposed for a single activity.

Problems arise, however, when all the computers that are purposed for the single activity are not simultaneously operational. For instance, one or more computers may require rebooting, may be reserved for higher-priority activities, may require upgrades or maintenance, etc. There is a significant amount of difficulty in managing and controlling these computers, particularly when numerous computers (e.g., thousands) are purposed for a specific activity.

One method to manage availability is to commission staff to monitor states of computing devices in a data center. People, however, are error-prone; individuals frequently administer computers in different conflicting ways. In addition to the inconsistency in administration, costs can be high when commissioning people to perform such management tasks.

An alternative approach is to develop a software-based solution that monitors operational states of computers and manages their activities. Typically, these software-based solutions tend to be rigid with respect to stakeholder's goals of the data center and computers utilized in the data center. In other words, these solutions operate sub-optimally if goals change and/or if computers are added or removed from the data center. Updating the software-based solution for a dynamic system is costly and error-prone.

SUMMARY

The following is a brief summary of subject matter that is described in greater detail herein. This summary is not intended to limit the scope of the claims.

Various technologies pertaining to a framework for generating an adaptive computing system that is configured to perform one or more computational tasks are described herein. Pursuant to an example, the computing system may be a control system for controlling one or more processes. Additionally, the computing system may be a system that is distributed across a plurality of computing devices. The framework allows designers to design vastly different adaptive computing systems, wherein the adaptive computing systems can be tailored to the specifics of the environment in which they are deployed.

The framework comprises a mechanism that allows designers to compose a solution with respect to a particular computing problem out of pluggable components. These components can be composed into active entities tasked with specific objectives. These compositions of components are hereinafter referred to as "Agents". Agents are interchangeable; they are not bound to other Agents at compile-time. In one exemplary embodiment, dependency injection is used to compose the requisite Agents necessary to satisfy the designer's specific requirements. An interface is provided that allows designers to generate Agents in a uniform fashion, and a library of pre-defined classes of components may be provided with the framework to aid in their composition.

The framework additionally comprises a mechanism that facilitates building of an environment (also referred to as a container) in which the composed Agents execute. The environment can be flexibly configured with respect to an operating system upon which it is built—that is, the designer can build the computational system on any suitable operating system. Additionally, the environment can be installed on multiple computers, thereby promoting computational distribution. Moreover, the framework provides a mechanism for describing how the Agents are to be executed over multiple computing devices. Accordingly, the designer can adapt how the computing system operates with respect to physical computing devices as goals of the computing system alter and/or as hardware evolves.

The framework additionally comprises an interface abstraction that exposes an application programming interface (API) to agent components that conforms to a publish/subscribe model. The interface abstraction allows a designer of the computing system to select an event channel (also referred to as an enterprise service bus) over which the Agents communicate with one another. While the interface abstraction conforms to a publish/subscribe model, such interface abstraction can be extended to support both mediated and non-mediated communications. More specifically, the designer can choose as to whether Agents communicate by way of a brokered channel, by way of a point-to-point channel, or in-process in the same address space through direct object references.

Other aspects will be appreciated upon reading and understanding the attached figures and description.

DETAILED DESCRIPTION

Various technologies pertaining to a framework that facilitates building an adaptive computing system will now be described with reference to the drawings, where like reference numerals represent like elements throughout. In addition, several functional block diagrams of exemplary systems are illustrated and described herein for purposes of explanation; however, it is to be understood that the functionality that is described as being carried out by certain system components may be performed by multiple components. For instance, a component may be configured to perform functionality that is described as being carried out by multiple components.

Figure 1:
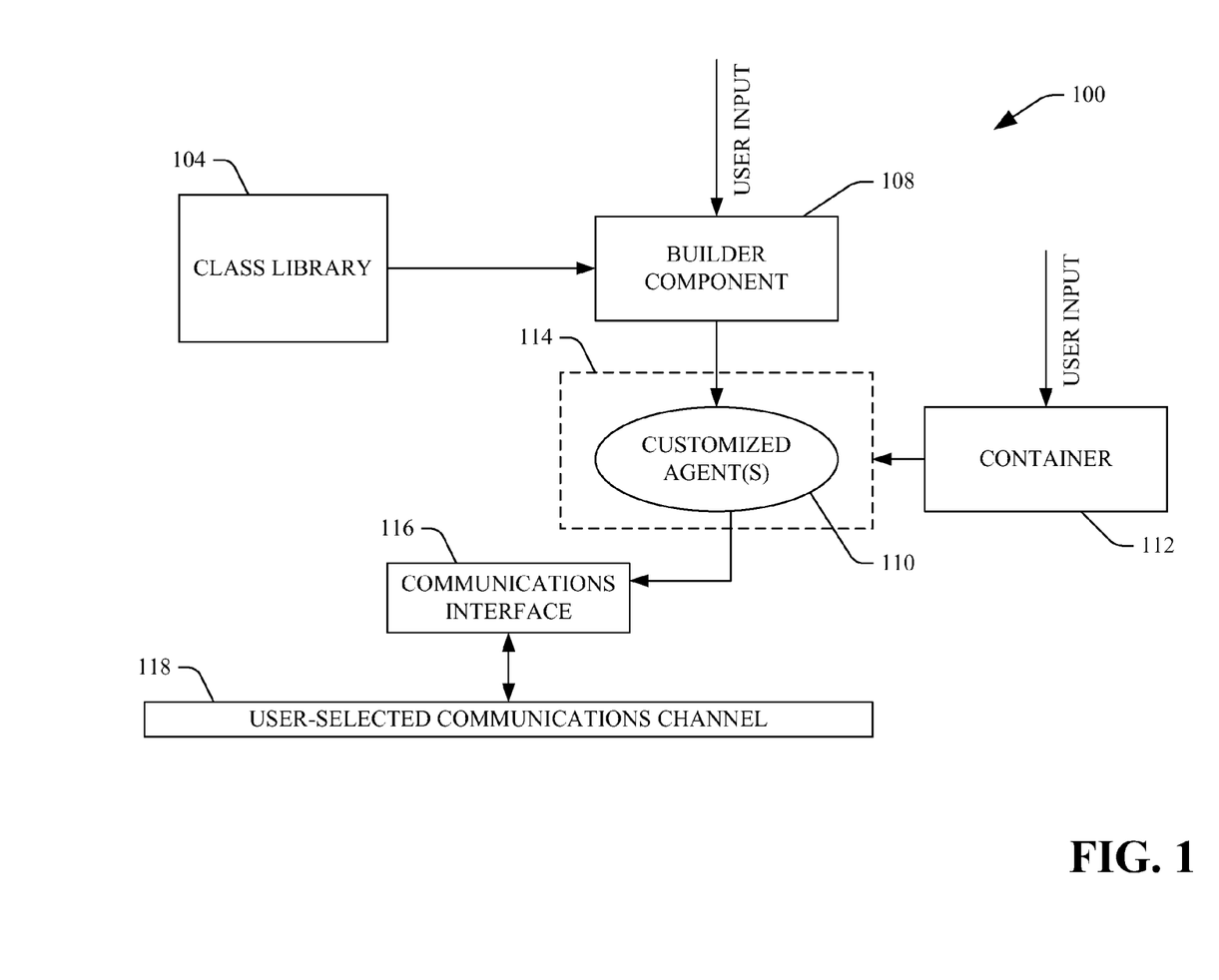
FIG. 1 is a functional block diagram of an exemplary framework that facilitates building an adaptive computing system.

With reference to FIG. 1, an exemplary system 100 that facilitates building an adaptive computing system is illustrated. The system 100 as described herein is a framework that is configured to aid in construction of a customized and adaptive computing system. As used herein, a "computing system" is a system that is configured to perform some computational task in accordance with one or more predefined stakeholder goals. In an example, a computing system may be a management system configured to manage the operation of a plurality of computing devices. In another example, a computing system may be a control system configured to control the operation of one or more machines and/or computing devices. In a specific example, a computing system may be a control system configured to control the operation of computers in a data center, wherein control of the operation of the computers comprises scheduling workloads of computers, causing conditions in service level agreements (SLAs) of customers to be honored, scheduling operation of one or more computers (e.g., scheduling maintenance), etc. In still yet another example, a computing system that can be generated by way of the system 100 can be installed on a single computing device, such that the computing system is configured to operate in accordance with one or more goals pertaining to the device. An example can include monitoring of resources (e.g., memory usage, hard drive, etc.) in a portable computing device, such as a cell phone, for purposes of predicting failure. These and other types of computing systems will be ascertainable to one of ordinary skill in the art.

The system 100 comprises a library of predefined classes 104, wherein a designer of a computing system can leverage classes in the library of classes when building customized Agents. As used herein, an Agent is a computing component that is configured to perform specific tasks autonomously. There are several types of Agents, which will be described in greater detail below. When commissioned in a computing system, Agents can be distributed across multiple computing devices, and are configured to monitor and interact with a target system, such as a data center, industrial machinery utilized in an industrial process, a single computing device, or the like. Agents are unaware of other Agents when commissioned in a computing system, but are aware of types of events produced by other Agents. Moreover, Agents are decoupled from one another in terms of at least one of space, time, transport, synchronization, or communications direction. Decoupled in terms of space is used herein to indicate that Agents need not know details of communicating with other Agents when publishing events or subscribing to events. Decoupled in terms of time is used herein to indicate that Agents communicating with one another (e.g., via events) need not be simultaneously active. Decoupled in terms of synchronization is used herein to indicate that Agents need not coordinate with one another when publishing events and/or subscribing to events. Decoupled in terms of transport is used herein to indicate that Agents can be configured to communicate by way of a mediated communications channel, a non-mediated point-to-point communications channel, or a non-mediated object reference-based communications channel. Decoupled in terms of communications direction is used herein to indicate that Agents can communicate by way of either the push or pull model of message delivery. This can be accomplished by incorporating a staged event driven architecture (SEDA) to address the need to change the directionality of the message flow and also incorporate the ability to govern the amount of information that is exchanged between Agents.

The system 100 further includes a builder component 108 that can be employed by a designer of the computing system to build a customized Agent 110 to commission in the computing system. The builder component 108 can be configured to allow a designer of the computing system to utilize the class library 104 and standardized interfaces to build customized Agents 110. The class library 104 can include various classes of differing types, and the designer of the computing system can instantiate Agents depending upon a desired type. The type of class selected by the designer can be configured to define lifecycle management features pertaining to Agents, type of communications channel to be utilized by an instantiated Agent of a particular type, etc. Building of customized Agents will be described in greater detail below.

The system 100 further comprises a container 112 that is configured to provide an execution environment 114 for Agents. In this exemplary system 100, the container 112 is shown to provide an execution environment for the customized Agent 110. It is to be understood, however, that the container 112 is configured to provide execution environments for each Agent or a federation of Agents commissioned in the computing system that is described by the designer. Thus, in a distributed system, the designer can select which Agents execute and on which computing devices those executions occur.

The system 100 also includes a communications interface 116 that is configured to act as an interface abstraction over a designer-selected (pluggable) communications channel 118. In other words, the designer of the computing system can choose a communications channel that is desirably utilized to facilitate communications between particular Agents in the computing system. Such communications channel can be a mediated or a non-mediated channel. For instance, the communications channel 118 can be an Event Bus (also referred to as an Enterprise Service Bus) of the choosing of the designer. Many event buses are currently in existence, and the communications interface 116 can interface the Agents 106 and 110 with the communications channel 118. Pursuant to an example, the communications interface 116 can be a publish/subscribe interface, such that Agents executing in the computing system can communicate by way of the publish/subscribe interface. Additionally, as described above, communications channels over which the Agents communicate can be pluggable, such that designers of computing systems can implement a communications channel of their choosing. These communications channels include channels that facilitate in-process communications (e.g., communications through direct object references). These channels also include channels that facilitate point-to-point communications (e.g., non-mediated communications through standard communications APIs such as WCF, sockets, named pipes, and shared memory). The channels can also include event buses, as mentioned above, that utilize a publish/subscribe protocol to facilitate communications amongst and between Agents. In addition, each Agent executing in the computing system can communicate over more than one communication channel of potentially different types. This can help facilitate different message types (i.e. management versus data) not competing on the same communication channel.

The resulting computing system installed on a computing device or across multiple computing devices is adaptive in that the designer can introduce new Agents or update existing Agents as goals of the computing system change and evolve. Additionally, communications channels are selectable by the designer of the computing system, such that preferred communications channels for a particular task can be selected by such designer. Further, those channels can be altered during the lifetime of an Agent's execution, allowing the underlying mechanism and topology of the system to dynamically adjust to changes, not only in the physical and logical topologies of the system, but to evolving refinements and extensions in the underlying technologies employed.

Additional details pertaining to the communications interface 116 and customized Agents will now be provided. As mentioned above, the communications interface 116 can be modeled as a publish/subscribe interface, such that Agents executing in the designed computing system need not be aware of details pertaining to the communications channel over which communications occur. For instance, dependency injection (DI) can be utilized to set up a communications channel between two Agents that is a mediated channel, a non-mediated point-to-point channel, or an in-process object reference. For each type of communications channel, a façade (computer-executable code exposing a uniform interface to the communications channel) can be provided. Such façades can be included in the communications interface 116, and can act as a translation mechanism between the framework 100 and the specifics of the communications channel chosen by the designer of the computing system. In an example, the communications channel can be a point-to-point channel built by the designer of the system, and such designer can expose specifics pertaining to how two Agents desirably communicate with one another. The specifics and nuances of the operation of these new channels are isolated to the custom channel. These custom channels are integrated as first-class citizens in the framework; they are functionally equivalent to the intrinsic channels provided natively by the framework.

The communications interface 116 provides an abstraction over these specifics that conforms to a publish/subscribe system. Thus, Agents executing in the system need only to publish events and subscribe to events, and the communications interface 116 handles transfer of events between appropriate Agents. When building an Agent that executes in such a manner, the designer can, through the builder component 108, select to build an Agent of a particular type that communicates via a point-to-point channel. If the point-to-point communications channel is a TCP/IP channel, identities of ports can be specified in the constructor of the Agent by way of the builder component 108, and through dependency injection the Agent communicates via publish/subscribe over that channel. This is enabled through dependency injection.

Additionally, while not shown, the framework 100 may include one or more predefined Agents. In an example, these Agents are configured to perform relatively simple monitoring tasks—thus, many computing systems will include such Agents. Examples of predefined Agents can include a performance counter sensor, a data logger, a performance counter logger, and an event processing agent. A performance counter sensor can be configured to output certain types of events (e.g., performance events) that are generated through interaction with an operating system. A data logger can be configured to log certain data or events in the framework. A performance counter logger can be configured to log performance data, and an event processing agent can be configured as a wrapper of a certain type of complex event processing functionality. Of course, myriad types of pre-defined Agents can be included in the framework 100.

Figure 2:
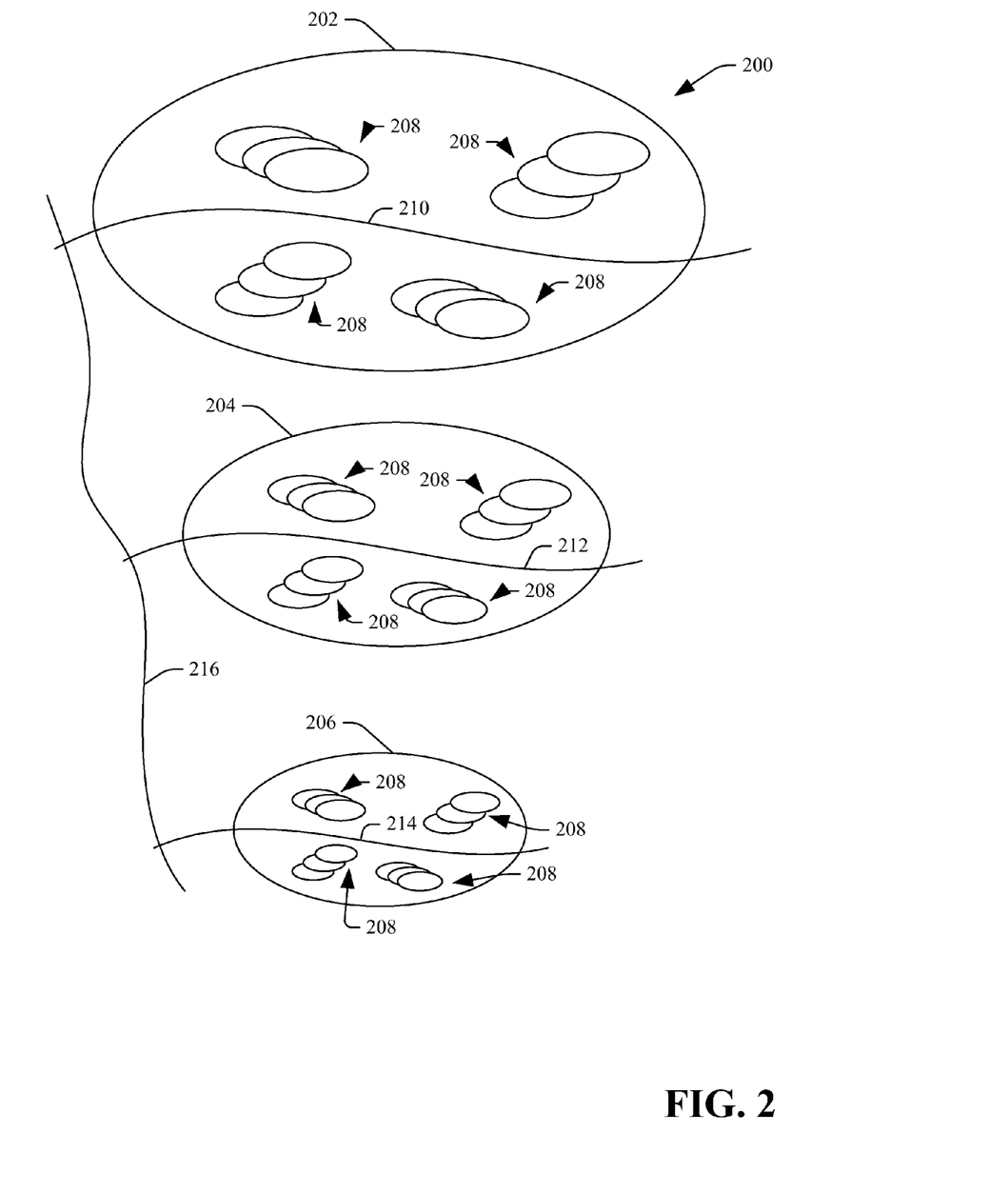
FIG. 2 illustrates an exemplary hierarchical structure of agents communicating with one another by way of interconnected event buses.

Referring now to FIG. 2, a hierarchical arrangement 200 of logical partitions of Agents is illustrated. The designer of the computing system can select Agents from the library 104 of predefined Agents and/or compose customized Agents such that they are placed in a logical partition. A logical partition includes one or more Agents. As discussed above, in an exemplary embodiment, Agents can be configured to communicate by way of events. Thus, Agents are unaware of other Agents in a designed computing system, but can be aware of events produced by other Agents. As Agents communicate by way of events, such Agents act autonomously and are decoupled from one another. In the arrangement depicted in FIG. 2, Agents are free to consume and process events at a time of their choosing and need not be concerned about blocking the Agents that produce particular events.

The hierarchical arrangement 200 shown in FIG. 2 comprises a plurality of logical partitions 202-206. Each of the logical partitions 202-206 can include at least one Agent executing therein. The logical partitions 202-206 can, in an exemplary embodiment, reside on separate computing devices. The logical partitions 202-206 can be created for a variety of reasons, including minimizing communication traffic or shared contextual awareness. Agents in logical partitions can communicate over, for instance, a series of event-driven message buses Alternatively, more than one logical partition can reside on a single computing device. Each of the logical partitions 202-206 includes one or more Agents (collectively referred to as Agents 208). The partitions 202-206 can be arranged hierarchically, such that groups of Agents communicate with other groups over a series of hierarchically-federated message buses 210-216. Agents can report problems upwards, and Agents can be influenced by their parents. In an exemplary embodiment, events can be routed over the message buses 210-216 by way of a publish/subscribe interface.

Figure 3:
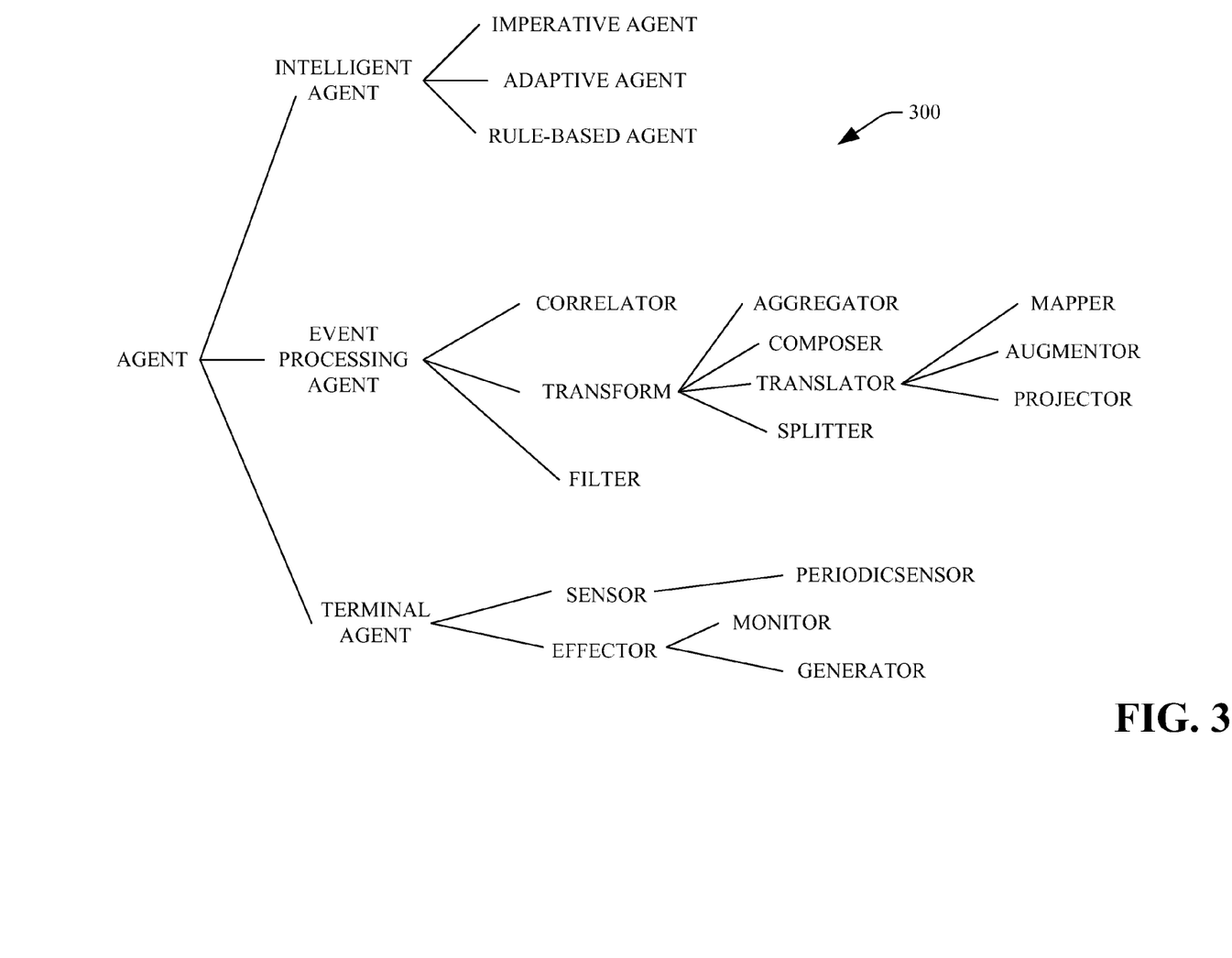
FIG. 3 illustrates an exemplary taxonomy of cooperative agents.

Now referring to FIG. 3, a hierarchy 300 illustrating types of Agents that may be included in a computing system is illustrated. In an exemplary embodiment, Agents may be configured to communicate with other Agents by way of events through a publish/subscribe interface, which serves to decouple Agents that produce events (producers) from Agents that consume events (consumers). This publish/subscribe interface decouples producers from consumers in three different manners: space: agents do not need to have knowledge of who is receiving and producing events or their location; time: agents that produce and receive events need not be active at the same time; communications direction: producers aren't blocked while producing events, and consumers receive callbacks.

As mentioned previously, a standard publish/subscribe model can be utilized to propagate events from producers to subscribers. Events generated and consumed by agents can have the following characteristics: 1) events can derive from a particular class; 2) events can be classified by type. Agents publish the type of events they produce to a global list of type identifiers and subscribing Agents can choose the types of events they want to receive from the global list; 3) Events can have properties; 4) the payload carries the underlying properties of the event; 5) Event Channel Adaptors can be mated with Agents' configuration object and subscription filter.

Agents can be instantiated and configured through utilization of a Dependency Injection mechanism. Dependency Injection (DI) is a technique for building loosely coupled (componentized) applications. DI provides a mechanism to handle dependencies between objects and to resolve those dependencies during the instantiation of those components at runtime. In the system 100 (FIG. 1), the builder component 108 can be utilized to configure which Agents are present in the system and the mechanism(s) by which they communicate, wherein the builder component 108 utilizes DI to perform such management tasks. In an exemplary embodiment, the framework 100 can utilize an event bus to transmit events between Agents. DI techniques can be employed to ensure that the Agents are correctly instantiated and configured as desired. In an example, a configuration file, a database, code, or the like can be utilized to specify configuration of Agents.

The Agents shown in the hierarchy 300 are the primary processing units in the computing system. The framework provides a rich and flexible taxonomy of Agents that captures two important aspects: 1) behavioral, in that the function or job of an Agent to perform is described; and 2) structural, in that the surface area or inputs and outputs of an Agent are described.

The framework provides a core set of Agent functionality which can be utilized to derive an Agent. In an example, Agents can derive from a single class with a particular name (e.g., Agent). Below is provided an exemplary of a hierarchy of Agent classes and corresponding namespaces:

tasks performed by such an Agent include filtering of data, mapping from one data format and/or payload to another, aggregating several sources of data and/or transforming data.

Beneath the EventProcessingAgent in the hierarchy are agents of the following types; correlators, transformers, and filters. A correlator agent is an event processing agent that performs tests involving some state or context. A correlator agent can emit synthetic events that describe detected patterns. A transformer agent is an event processing agent abstract base class for agents that transform the data they receive in their incoming events. A filter agent is a stateless event processing agent that discards uninteresting events.

Beneath the transformer agent in the hierarchy are Agents of the following types: aggregators, composers, splitters, and translators. An aggregator agent is an event processing agent with multiple event sinks and a single event source such as a multiplexor. A composer agent is an event processing agent that takes multiple collections of incoming events and produces one or more output events. For example, a composer agent can perform actions similar to a relational join operator. A splitter agent is an event processing agent with a single event source and a multiple event sinks, such as a demultiplexor. A translator agent is an event processing agent that performs some form of translation on an event.

Beneath the translator agent in the hierarchy are agents of the following types: mappers, augmentors, and projectors. A mapper agent is an event processing agent that takes one event and maps it to a different event with possible additions and/or deletions. An augmentor agent is an event processing

| | |
|---|---|
| EventProcessingAgents | ManagementFramework.Agents |
|     Filters | ManagementFramework.Agents.EventProcessingAgent |
|     Correlator | ManagementFramework.Agents.EventProcessingAgent |
|     Augmenter | ManagementFramework.Agents.EventProcessingAgent |
|     Mapper | ManagementFramework.Agents.EventProcessingAgent |
|     Projector | ManagementFramework.Agents.EventProcessingAgent |
|     Aggregator | ManagementFramework.Agents.EventProcessingAgent |
|     Composer | ManagementFramework.Agents.EventProcessingAgent |
|     Splitter | ManagementFramework.Agents.EventProcessingAgent |
|     Transform | ManagementFramework.Agents.EventProcessingAgent |
| IntelligentAgents | ManagementFramework.Agents |
|     Imperative Agent | ManagementFramework.Agents.IntelligentAgent |
|     Learning Agent | ManagementFramework.Agents.IntelligentAgent |
|     Rules Based Agent | ManagementFramework.Agents.IntelligentAgent |
| Terminals | ManagementFramework.Agents |
|     Sensor | ManagementFramework.Agents.Terminals |
|         PeriodicSensor | ManagementFramework.Agents.Terminals.Sensor |
|     Effector | ManagementFramework.Agents.Terminals |
|     Monitor | ManagementFramework.Agents.Terminals |
|     Generator | ManagementFramework.Agents.Terminals |

One of these base classes can be extended to create a new Agent. For example, to build a performance counter sensor, the Periodic sensor class can be derived from as follows:

public class PerformanceCounterSensor:PeriodicSensor

As shown in FIG. 3, the hierarchy 300 of Agents comprises a plurality of different types of Agents. A description of functionality of such Agents is described herein. At the top of the hierarchy is an Agent, which encapsulates the types of agents described below. For example, an EventProcessingAgent is an Agent that can be configured to produce and consume information packaged in the form of events. An event processing agent may subscribe to events and may publish events (or both). Examples of data manipulation agent that adds information to the incoming event. A projector agent is an event processing agent that deletes information from an incoming event.

An intelligent agent is a type of agent that processes information gathered from events and implements rules, algorithms, or other adaptive learning techniques to effect a change in the computing system. Beneath the intelligent agent in the hierarchy are Agents of the following types: imperative agents, adaptive agents, and rule-based agents. An imperative agent is written in an imperative manner, i.e., an explicit set of instructions is provided and the agent executes those instructions in a prescribed fashion over a fixed set of data. A learning agent is an Agent that adapts dynamically or learns from gathered information. A rule-based agent is an Agent that is driven by rules such as a productions system or an event-condition-action (ECA) model.

A terminal agent is a type of Agent that exists at the extremity of the system, i.e., the terminal points in the graph of cooperating agents. Terminal agents are in contact with the outside world. The two primary examples are sensors and effectors. Sensors capture stimuli in that world, while effectors induce actions into that world. For example, a terminal Agent can be configured to receive data produced by a hardware sensor and/or can be configured to induce change in that external world. Agents can have dual roles: a first role to receive notification(s) from producer(s); and (2) a second role to take further action in a target system.

Beneath a sensor agent in the hierarchy is a periodic sensor agent, which is a periodic sensor agent that is configured to sample information periodically. Beneath an effector agent in the hierarchy are agents of the following types: monitor and generators. A monitor is an Agent that watches things, e.g., temperature, utilization, throughput, and reports on the status of that which it has been configured to monitor. A generator agent is an Agent that produces information such as random numbers, heartbeats, or mock data. It is a sensor that doesn't require a connection to the outside world for it to be able to generate an event, i.e., it has its own volition and source of information.

Figure 4:
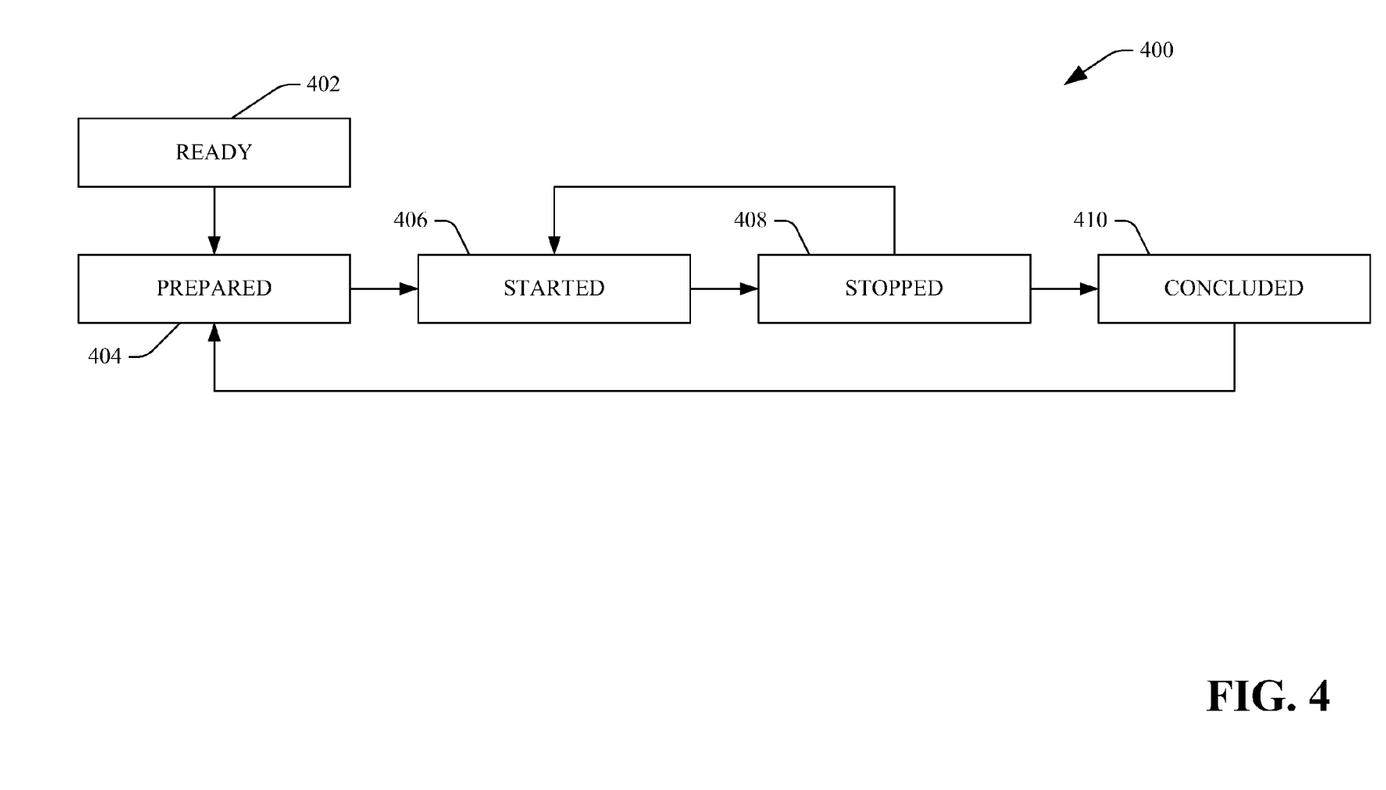
FIG. 4 is a state diagram that illustrates possible states of agents.

With reference now to FIG. 4, an exemplary state diagram 400 that illustrates states of agents once they are commissioned in connection with a computing system is illustrated. To execute an agent in the computing system, each agent should have the following: one or more events that use a communications channel to publish events or subscribe to events, a configuration file, a deployment file, and lifecycle member implementations.

Each Agent can implement methods shown in the state diagram 400 that control the lifecycle of the agent. The toolkit/framework calls these methods to start, stop, initialize, finalize, and terminate Agents. Agents also perform tasks such as subscribing to events or advertising the events they publish in these methods. The flow diagram 400 includes a ready state 402, wherein an Agent can indicate that it is ready to receive lifecycle management events. The flow diagram 400 further includes a prepared state 404. The prepared state 404 is associated with a method that contains preparation that cannot be performed in the constructor. Any events that are desirably published by the Agent or subscribed to by the Agent are advertised in the method corresponding to the prepared state.

The flow diagram 400 additionally includes a started state 406, wherein the prepared state 404 can transition to the started state 406. The started state 406 is associated with a method that starts the processing of the Agent. Any events that are desirably consumed by the Agent are subscribed to in the started state 406.

The flow diagram 400 further includes a stopped state 408, wherein the stopped state can be transitioned to from the started state 406. The stopped state 408 is associated with a method that stops the processing of the Agent. Any events that are desirably unsubscribed to by the Agent are unsubscribed to in the stopped state 408. As can be ascertained, the state of the Agent can also transition from the stopped state 408 to the started state 406.

The flow diagram 400 further includes a concluded state 410, wherein the state of the agent can transition from the stopped state 408 to the concluded state 410. The concluded state 410 is associated with a method that concludes the work of the agent, including disposing any resources such as timers or streams. This method may not need to be overridden as many agents are able to operate without intrinsic state that requires this specialized cleanup.

Figure 5:
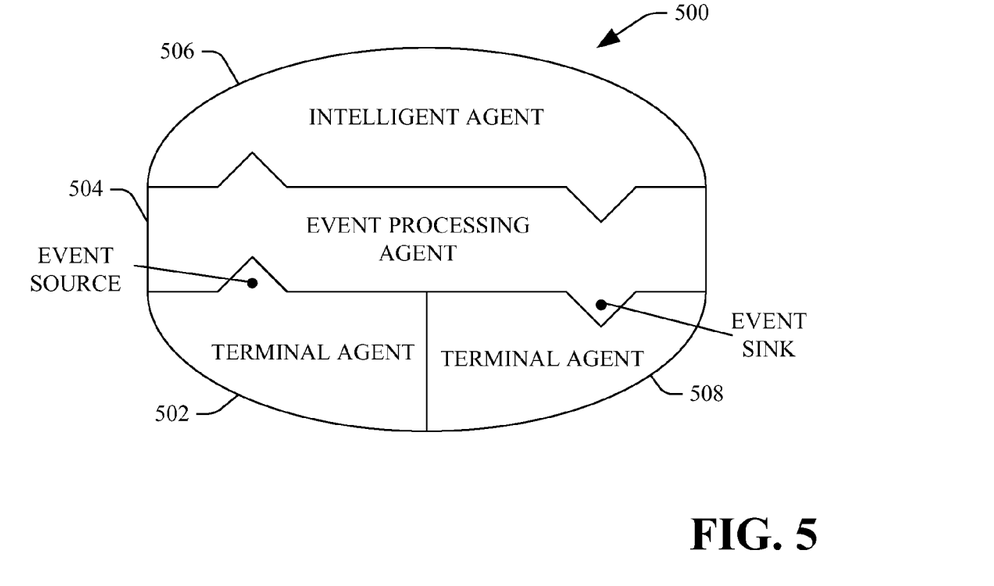
FIG. 5 illustrates an exemplary federation of agents communicating with one another in-process.

Referring now to FIG. 5, an exemplary depiction of a grouping of Agents 500 communicating with one another in an in-process manner is illustrated. A first terminal Agent 502 is in communication with a hardware sensor (not shown), and generates an event. This event is provided in-process to an event processing Agent 504, which performs some suitable processing to generate another event that is suitable for receipt by an intelligent agent 506. The intelligent agent undertakes a form of processing described above with respect to the received event, and outputs an event that is to be received in-process by the event processing agent 504. The event processing agent 504 receives such an event and outputs an event that is suitable for receipt by another terminal agent 508. This terminal agent 508 is configured to effect some change in the computing system (target system). In this example, the designer has chosen to have the agents 502-508 communicate in-process with one another.

Figure 6:
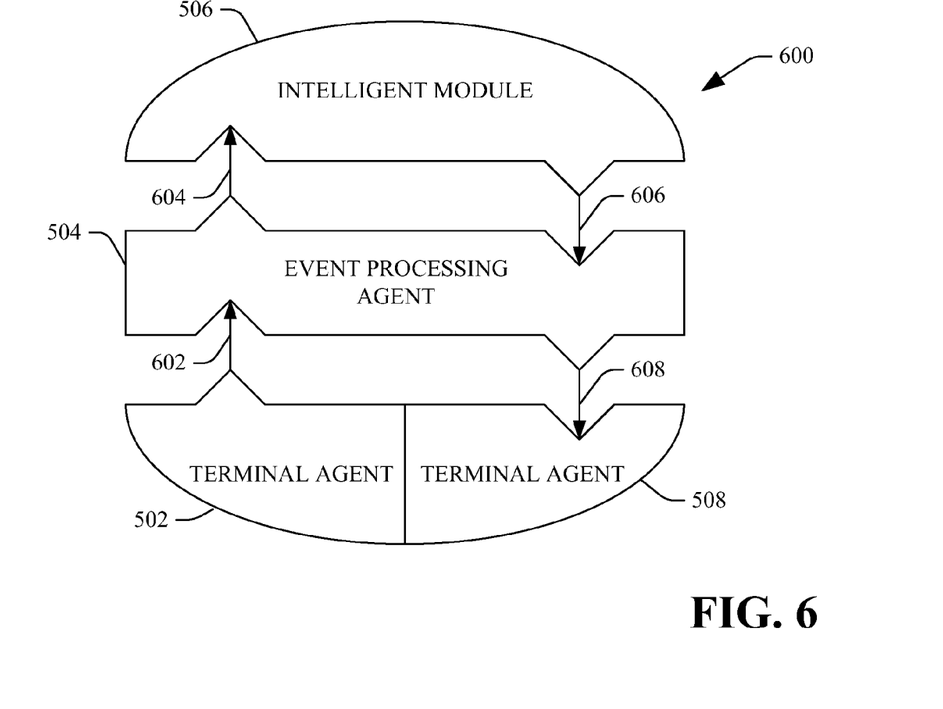
FIG. 6 illustrates an exemplary federation of agents communicating with one another by way of a point-to-point communications channel.

With reference to FIG. 6, an exemplary depiction of a grouping of Agents 600 communicating with one another by way of point-to-point connections is illustrated. FIG. 6 shows a plurality of point-to-point communications channels 602-608 that are utilized to transmit events amongst the agents 502-508.

Figure 7:
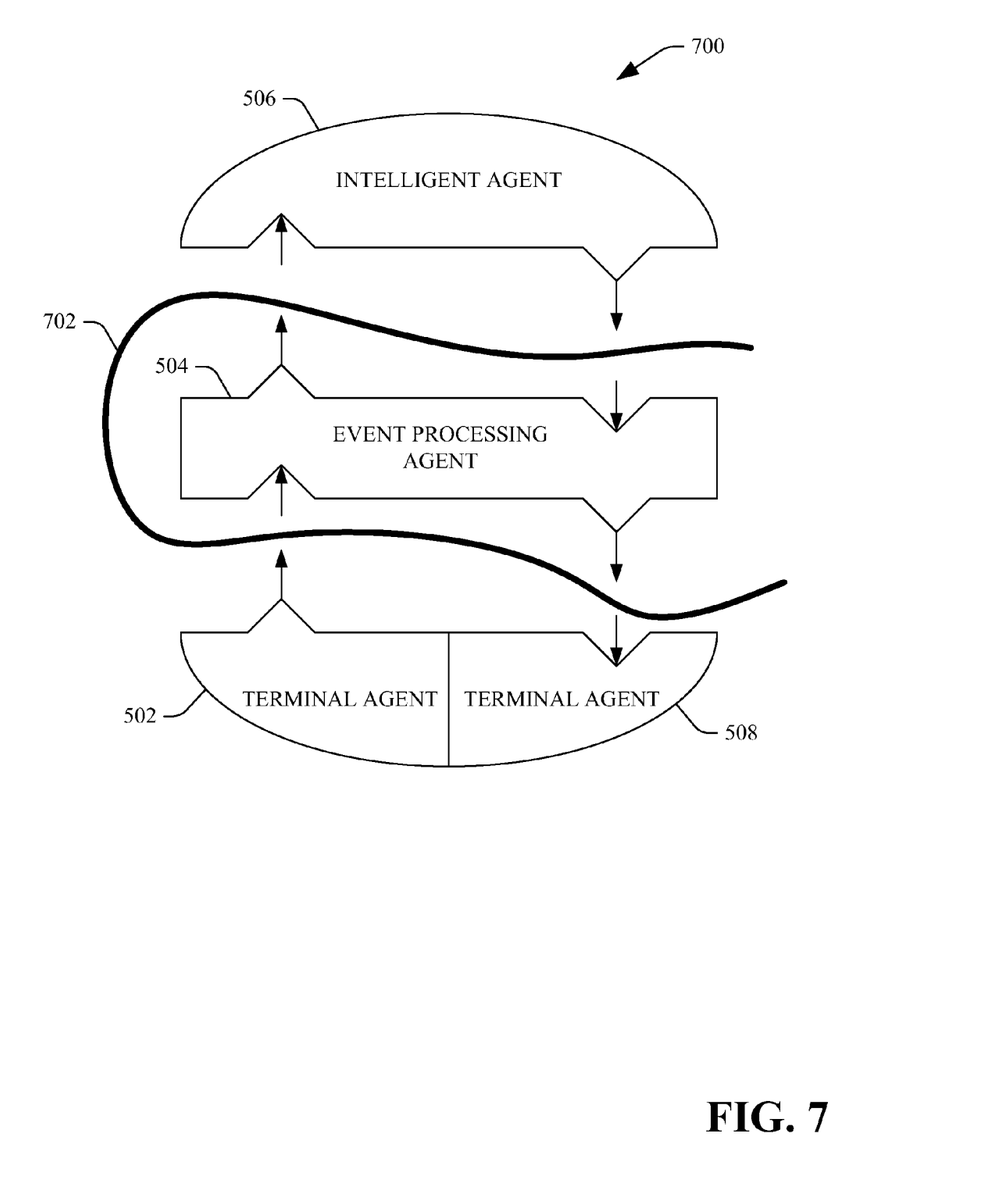
FIG. 7 illustrates an exemplary federation of agents communicating with one another by way of a mediated event bus.

Turning now to FIG. 7, an exemplary depiction of a grouping of agents 600 communicating with one another by way of a mediated communications channel is illustrated. That is, the designer has configured the agents 502-508 to publish certain events and subscribe to certain events, and these events can be received by way of a mediated communications channel 702.

Figure 8:
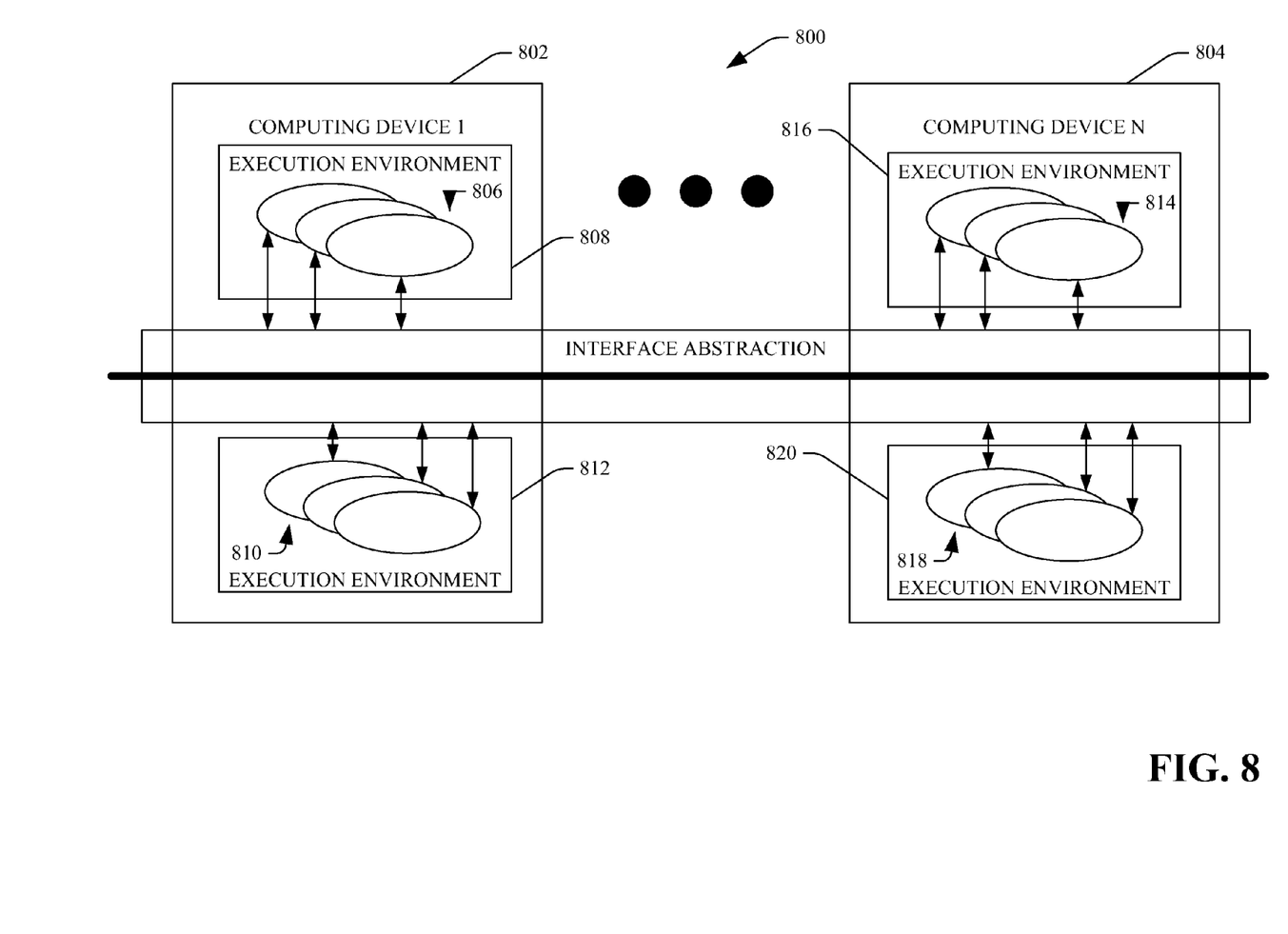
FIG. 8 is a functional block diagram of an exemplary distributed computing system built by way of a framework described herein.

Now referring to FIG. 8, an exemplary computing system 800 that is distributed across a plurality of networked computing devices is illustrated. In an example, the computing system 800 may be a control system 800 that is implemented to control certain aspects of a data center, including computational workloads on computing devices, amongst other aspects. The computing system 800 comprises a plurality of networked computing devices 802-804. The computing devices 802-804 can include server racks, personal computers, laptop computers, portable computing devices, routers, bridges, or the like. The computing device 802 comprises a first plurality of agents 806 that are executing in a first execution environment (container) 808. The computing device 802 also comprises a second plurality of agents 810 that are executing in a second execution environment 812.

The computing device 804 comprises a third plurality of agents 814 that are executing in a third execution environment 816, and a fourth plurality of agents 818 that are executing in a fourth execution environment 820. A configuration file and/or deployment file can specify the containers in which the Agents are to execute. Moreover, as indicated above, the agents can be configured to publish events and subscribe to events in connection with meeting an objective of the computing system.

The computing system 800 further includes an interface abstraction 824 that allows Agents to communicate with one another by way of a mediated or non-mediated communications channel 826 at the choosing of the designer of the computing system 800. The system 800 is adaptive as agents can be modified, decommissioned, restarted, etc., depending on the changing parameters and/or goals pertaining to the computing system 800.

Figure 9:
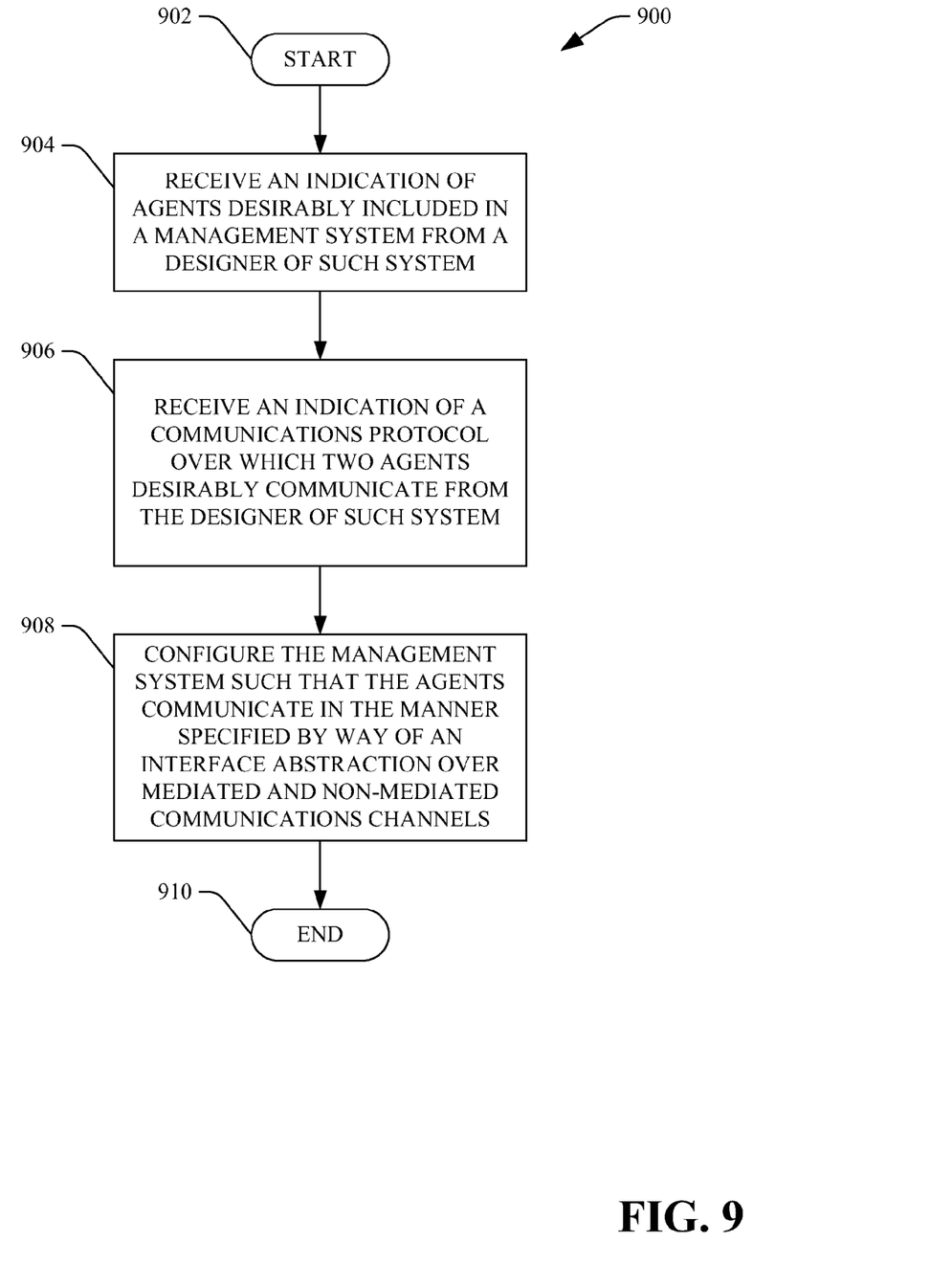
FIG. 9 is a flow diagram that illustrates an exemplary methodology for building an adaptive computing system.

With reference now to FIG. 9, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 9, a methodology 900 that facilitates constructing a computing system that is configured to manage a particular task, such as controlling computing devices in a data center, is illustrated. The methodology 900 begins at 902, and at 904 an indication is received pertaining to agents that are desirably included in a management system from a designer of such system. The agents can be customized by the designer of the system and/or can be selected from a library of predefined Agents.

At 906, an indication of a communications channel over which at least two of the agents desirably communicate is received from the designer of the computing system. As described above, a toolkit/framework that facilitates developing and deploying computing systems can include an interface abstraction over mediated and non-mediated communications channels, such that the designer can choose how the agents desirably communicate with one another.

At 908, the management system (computing system) is configured such that the agents communicate in the manner specified by way of an interface abstraction over mediated and non-mediated communications channels. The methodology 900 completes at 910.

Now described herein is the exemplary building of two customized Agents—a first agent that is configured to publish clock events; and a second agent that is configured to monitor clock events. While below there is discussed certain files, event channels, languages, etcetera, it is to be understood that the building of such agents is provided for purposes of explanation only, and is not to be construed to limit the hereto-appended claims.

To execute in a particular framework that can be utilized in accordance with aspects described herein, an agent can have the following: one or more events that use a communications channel (EventChannel) to publish or subscribe to events; a configuration file; a deployment file; and lifecycle interface member implementations. Lifecycle members have been described above with respect to FIG. 4. As indicated above, agents can be configured to communicate with each over an event channel, and using the event channel agents can publish or subscribe to one or more events. The following methods and classes can be provided: Publish—posts an event to an event bus; Subscribe—subscribes to an event available on the event bus; Unsubscribe—unsubscribes to an event on the event bus; Advertise—advertises the types of events that an Agent publishes; Unadvertise—retracts an advertisement that was previously published. Agents can be instantiated and configured using any of a number of available dependency injection frameworks, for example, the Unity dependency injection framework.

Agents can be configured in the constructor via Dependency Injection. The constructor configurations can be stored in a configuration file with a name that is substantially similar to a name of the agents. The configuration file can also include information to configure and instantiate a selected event channel. Once configured, the agent can call predefined event channel methods. A selected event channel can be mated with a configuration object as shown in this example from an exemplary configuration file:

```
<register type="EventChannelAdapter" mapTo="WspAdapter">
    <constructor>
        <param name="name" parameterType="string"
        value="WspAdapter01"/>
        <param name="configuration" type="EventBusConfiguration"/>
    </constructor>
</register>
```

The deployment file specifies the agent configuration file to run and where that agent should run. In this portion of an exemplary deployment file, the Agents, i.e., the producer and consumer of the clock events are run on the local host.

```
<container>
    <instance name="Generator" value="TickTockGenerator;localhost"
    type="CD" />
    <instance name="Monitor" value="TickTockMonitor;localhost"
    type="CD" />
</container>
```

An exemplary generator agent, the TickTockGenerator, produces events carrying the local wall-clock time in ticks is a relatively simple agent that publishes TickTockEvents. These events can be consumed by an exemplary monitor agent, the TickTockMonitor. This exemplary generator agent can include: 1) an agent class that derives from a GeneratorAgent type; and 2) an event class that derives from an abstract event class. As mentioned above, agents are instantiated and configured using Dependency Injection in a configuration file. To create the TickTockGenerator agent, the following steps can be taken:

1) An agent class is created that derives from the generator agent type:
   public class TickTockGenerator:Generator
2) Each agent constructor has a name and event channel adapter parameters. The TickTockGenerator constructor also configures the TimeSpan member used to send these TickTockEvents at prescribed intervals. These create the constructor with the following parameter list:

```
public TickTockGenerator(
    string name, EventChannelAdapter channel, TimeSpan interval)
    : base(name, channel)
```

3) The TickTockGenerator constructor can be added to the class, and the type of event that the Agent is to publish can be declared. Additionally, a timer can be initialized. Accordingly, the following line can be added to declare that this generator publishes, i.e., produces, the TickTockEvent type:
   PublicationTypes.Add(typeof(TickTockEvent));
Additionally, the following lines can be added to set the timer and call the OnTimerEvent to publish events:

```
Interval = interval;
Timer = new Timer(new TimerCallback(OnTimerEvent), null,
        Timeout.Infinite, Timeout.Infinite);
```

4) A timer class can then be added to control how often to emit clock-time events:

private Timer Timer {get; set;}

5) The method corresponding to the prepared state can be added to the TickTockGenerator class to allocate resources and prepare for activation.

6) The method corresponding to the started state can be added to activate the TickTockGenerator agent and set the timer:

```
Timer.Change((int)Interval.TotalMilliseconds,
             (int)Interval.TotalMilliseconds);
```

7) The method corresponding to the stopped state can be added to the TickTockGenerator to stop the agent.

8) The method corresponding to the concluded state can be added to the TickTockGenerator agent to conclude processing and dispose of any members.

9) A particular event handler method can be added to the class to publish events private void OnTimerEvent(object obj)

As mentioned above, a TickTockEvent is generated, wherein such event can be published by the generator agent. Events are the vehicle for agents to communicate and pass information to other agents. The TickTockGenerator class can periodically publish a TickTockEvent. This is also shown in the following line of code:

EventChannel.Publish(new TickTockEvent( ));

The following procedures can be used to create the TickTockEvent:

1) A class is created that derives from a particular class (e.g., the AbstractEvent class):

public class TickTockEvent:AbstractEvent

Properties can be added to the class that includes information pertaining to the state of the event:

```
// The current date and time on this machine expressed in UTC.
public long Ticks { get; set; }
```

An exemplary creation of an Agent that consumes the TickTockEvent, the TickTockMonitor agent, is now described. As described above, this agent is instantiated using Dependency Injection. This class inherits from base agent classes. The monitor agent can be created as follows:

1) A TickTockMonitor class can be created that derives from the Monitor agent type:

public class TickTockMonitor:Monitor

2) A constructor can be created with the name of the effector, the event channel used and a subscription filter:

```
public TickTockMonitor(string name,
        EventChannelAdapter channel,
        SubscriptionFilter<TickTockEvent> filter)
    : base(name, channel)
```

3) Subscription types can be added::
SubscriptionTypes.Add(typeof(TickTockEvent));

4) A subscription filter can be added to the class to filter unwanted events.

private SubscriptionFilter<TickTockEvent>Filter {get; set;}

The subscription filter can be set in the constructor.
Filter=filter;

5) A method corresponding to the lifecycle started state can be added to the class and events can be subscribed to. The event handler and the subscription filter can be specified when the events are subscribed to.

EventChannel.Subscribe<TickTockEvent>(ProcessTickTock, Filter);

6) A method corresponding to the lifecycle stopped state can be added to the class and events can be unsubscribed from:

EventChannel.Unsubscribe(typeof(TickTockEvent));

7) A method corresponding to the lifecycle concluded state can be added to the class to conclude processing and dispose of any members.

8) A event handler method can be created that receives a TickTockEvent.

public void ProcessTickTock(TickTockEvent tte)

An exemplary utilization of logging in connection with the TickTockGenerator agent will now be described. Logging can be a built-in feature for agents and can be configured in a configuration section of the TickTockGenerator configuration file.

```
<configSections>
    <section name="unity"
        type="Default.Practices.Unity.Configuration.-
            UnityConfigurationSection, Default.Practices.Unity.-
            Configuration"/>
    <section name="loggingConfiguration"
    type="Default.Practices.EnterpriseLibrary.Logging.Configuration.-
        LoggingSettings, Default.Practices.EnterpriseLibrary.-
        Logging" />
</configSections>
```

The following line can also be added to the log file:
<loggingConfiguration
configSource="VerboseFileAndConsole.logconfig"/>

Portions of an exemplary configuration file are provided herein for the TickTockGenerator agent. To expose a new agent to the toolkit/framework, the following can be inserted into the Unity configuration block:

```
<assembly name="ManagementFramework.Samples.TickTock"/>
<namespace name="ManagementFramework.Samples.TickTock" />
```

The container for the Agent can be specified as follows:
<container name="TickTockGenerator">
The following XML can be utilized to register the TickTockGenerator agent with the name of the TickTockGenerator01, the event channel adapter and the timer interval.

```
<register type="TickTockGenerator">
    <constructor>
        <param name="name" parameterType="string"
            value="TickTockGenerator01"/>
        <param name="channel" type="EventChannelAdapter">
            <dependency/>
        </param>
        <param name="interval" type="System.TimeSpan"
```

```
        value="0.0:0:1" />
    </constructor>
</register>
```

The following XML can map the event channel adapter to the WSP adapter and can specify the event channel name and event bus configuration:

```
<register type="EventChannelAdapter" mapTo="WspAdapter">
    <constructor>
        <param name="name" parameterType="string"
            value="WspAdapter01"/>
        <param name="configuration" type="EventBusConfiguration"/>
    </constructor>
</register>
```

Thereafter, the event channel can be configured to map to a specific event bus (the WSP event bus in this example), the configuration can be given a specific name (EventBusConfiguration01), and the event channel can be given a specific name (EventBus01).

```
<register type="EventChannelConfiguration"
mapTo="EventBusConfiguration">
    <constructor>
        <param name="name" parameterType="string"
            value="EventBusConfiguration01"/>
        <param name="eventChannelName" parameterType="string"
            value="EventBus01"/>
        <param name="isLocalOnly" parameterType="bool" value="false"/>
    </constructor>
</register>
```

The configuration of the TickTockMonitor agent can be substantially similar to the configuration of the TickTockGenerator agent. There may be, however, some changes—such as an identification of a hosting container:

```
<!-- A container hosting the TickTockMonitor -->
<container name="TickTockMonitor">
```

The following XML registers the TickTockMonitor with the name of the agent and the event channel adapter:

```
<register type="TickTockMonitor">
    <constructor>
        <param name="name" parameterType="string"
            value="TickTockMonitor01"/>
        <param name="channel" type="EventChannelAdapter"/>
        <param name="filter" type="SubscriptionFilter"/>
    </constructor>
</register>
```

A portion of an exemplary deployment file is now provided. The deployment file informs the toolkit/framework where an agent is to be deployed. In this example, both agents are deployed on the local host. The name field gives a name to the agent and the value field provides two pieces of information: 1) the name of the configuration file used to describe the agent and, separated with a semi-colon, b) the machine on which the agent is to run. The term CD refers to the configuration descriptor for the Agent.

```
<container>
    <instance name="TickTockGenerator"
        value="TickTockGenerator;localhost" type="CD" />
    <instance name="TickTockMonitor"
        value="TickTockMonitor;localhost" type="CD" />
</container>
```

Figure 10:
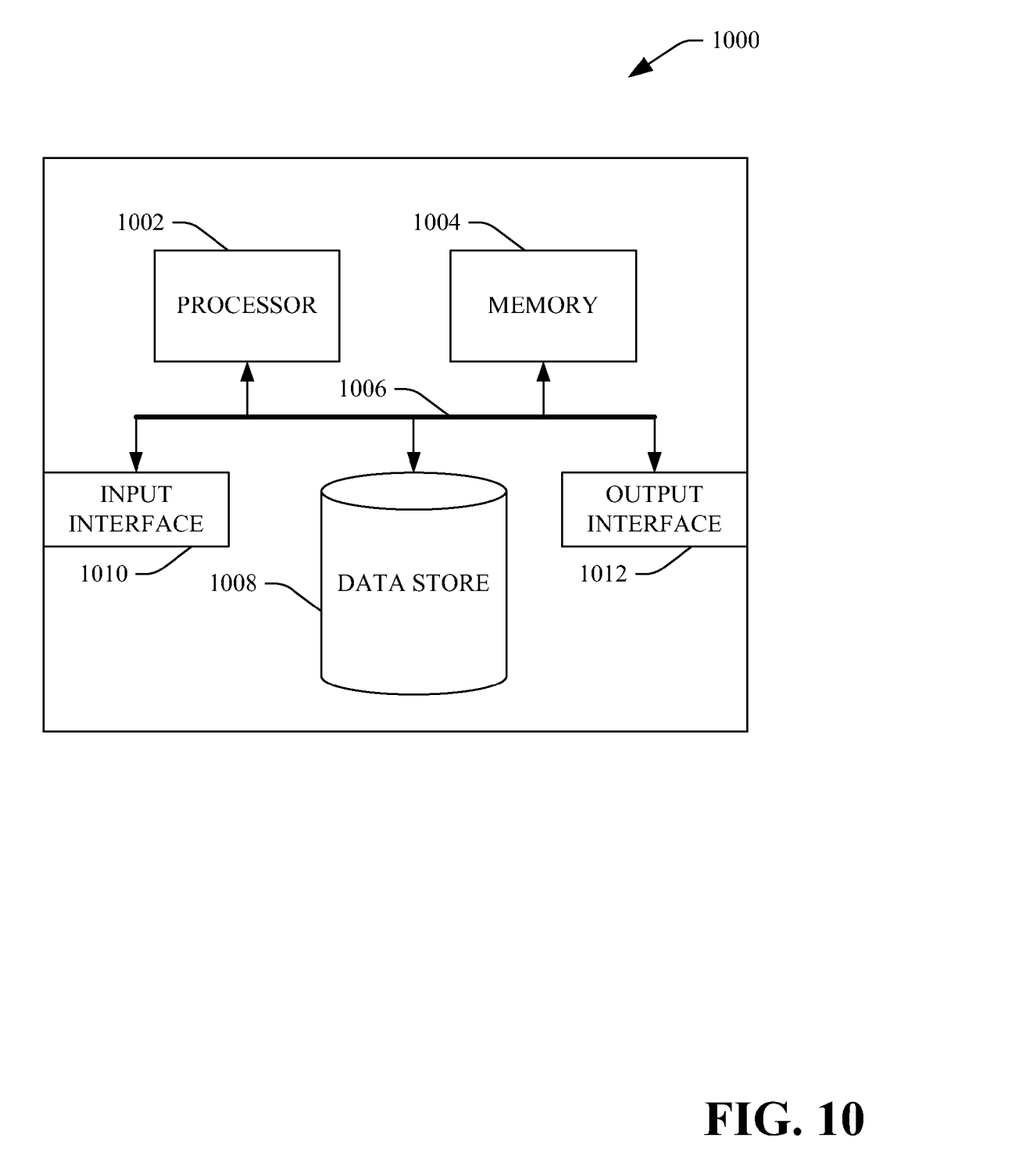
FIG. 10 is an exemplary computing system.

Now referring to FIG. 10, a high-level illustration of an example computing device 1000 that can be used in accordance with the systems and methodologies disclosed herein is illustrated. For instance, the computing device 1000 may be used in a system that supports building a computing system that is configured to perform some computational/management task. In another example, at least a portion of the computing device 1000 may be used in a system that supports executing such a computing system. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store Agents, event bus selections from a designer, etc.

The computing device 1000 additionally includes a data store 1008 that is accessible by the processor 1002 by way of the system bus 1006. The data store 1008 may be or include any suitable computer-readable storage, including a hard disk, memory, etc. The data store 1008 may include executable instructions, Agents, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component", "module", and "system" are intended to encompass hardware, software, or a combination of hardware and software. Thus, for example, a system, component, or module may be a process, a process executing on a processor, or a processor. Additionally, a system, component, or module may be localized on a single device or distributed across several devices. Furthermore, a system, component, or module may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computing device supporting a computer-implemented framework, the computer-implemented framework facilitates developing an adaptive control system for managing and controlling computing devices in a data center, the computing device comprising:
a processor;
memory storing instructions that, when executed by the processor, cause the processor to perform acts comprising:
composing Agents based upon instructions from a designer of the adaptive control system, wherein each of the Agents is configured to at least one of publish or consume events, each of the Agents is decoupled in terms of space, wherein Agents publishing the events do not specify Agents consuming the events and Agents consuming the events do not specify Agents publishing the events; and
defining a communications interface acting as a canonical abstraction over mediated and non-mediated communications channels, wherein a type of communications channel is selectable by the designer of the adaptive control system and is any of a mediated or non-mediated communications channel, the communications interface facilitates transmittal of events over the mediated or non-mediated communications channels, wherein the Agents are distributed across the computing devices of the data center and act cooperatively to:
control operation of the computing devices of the data center; and
schedule workloads at the computing devices in the data center.

2. The computing device of claim 1, the acts further comprising causing each Agent to execute in a respective computing device of the data center based upon instructions received from the designer of the adaptive computing system as to an identity of a computing device upon which an Agent is intended to execute.

3. The computing device of claim 1, wherein the communications interface acts as a canonical abstraction over a mediated communications channel.

4. The computing device of claim 3, wherein the mediated communications channel is an event bus.

5. The computing device of claim 1, wherein each of the Agents is additionally decoupled in at least one time, transport, synchronization, or communications direction.

6. The computing device of claim 5, wherein decoupled in terms of time indicates that Agents communicating with one another via events need not be simultaneously executing.

7. The computing device of claim 5, wherein decoupled in terms of synchronization indicates that Agents need not coordinate with one another when publishing events or subscribing to events.

8. The computing device of claim 5, wherein decoupled in terms of transport indicates that Agents are configurable to communicate by way of any of a mediated communications channel, a non-mediated point-to-point communications channel, and a non-mediated object reference-based communications channel.

9. The computing device of claim 5, wherein decoupled in terms of communications indicates that Agents are configurable to communicate by way of either a push model or pull model of message delivery.

10. The computing device of claim 1, wherein each of the Agents is assigned a respective type, the type being indicative of a position of an Agent that is assigned the type in a hierarchy of Agents.

11. The computing device of claim 1, wherein the Agents include at least one pre-defined agent that is provided by the framework in a library of pre-defined agents.

12. A method comprising:
receiving an indication of Agents to include in a management system from a designer of the management system, the management system being distributed across computing devices in a data center, the management system, when executed at the computing devices, is configured to control operation of the computing devices in the data center, wherein each of the Agents configured to at least one of consume or publish events, each of the Agents being of a respective type, the type being indicative of a position of an Agent in a hierarchy of Agents;
receiving a selection from the designer of the management system of a communications channel over which at least two of the Agents are to publish events and consume events; and
configuring the management system, wherein the Agents publish the events and consume the events over the communications channel by way of an interface abstraction over mediated and non-mediated communications channels, wherein the Agents act cooperatively to schedule workloads at the computing devices in the data center, wherein the method is performed by a computer processor.

13. The method of claim 12, wherein configuring the management system comprises utilizing dependency injection to configure Agents that are to execute in the management system.

14. The method of claim 13, further comprising:
receiving deployment data for at least one of the Agents, wherein the deployment data specifies a computing device in the data center upon which the at least one of the Agents is to execute.

15. The method of claim 12, wherein the communications channel is any one of an event bus, a non-mediated point-to-point communications channel, or an in-process object reference communications channel.

16. The method of claim 12, wherein the Agents are decoupled in terms of at least one of space, time, transport, synchronization, or communications direction.

17. A computer-readable memory comprising instructions that, when executed by a processor, cause the processor to perform acts comprising:
responsive to first input from a designer of an adaptive control system, composing customized Agents, wherein each of the customized Agents is decoupled in terms of at least one of space, time, transport, synchronization, or communications direction, each of the customized Agents configured to at least one of publish events or consume events, each of the customized Agents assigned a type that is indicative of a position in a hierarchy of Agents, and wherein the customized Agents are configured to be distributed across computing devices of a data center and act cooperatively as the adaptive control system for controlling operation of the computing devices of the data center and scheduling workloads in the data center; and
responsive to second input from the designer of the adaptive computing system, deploying the customized Agents across the computing devices of the data center, wherein the customized Agents transmit events between one another by way of an interface abstraction over mediated and non-mediated communications channels, wherein a type of communications channel is selectable by the designer of the adaptive control system and is any of a mediated or non-mediated communications channel.

18. The computer-readable memory of claim 17, wherein each of the customized Agents is decoupled in terms of space.

19. The computer-readable memory of claim 17, the acts further comprising receiving deployment data for at least one of the customized Agents, wherein the deployment data specifies a computing device in the data center upon which the at least one of the customized Agents is to execute.

20. The computer-readable memory of claim 17, the acts further comprising causing each customized Agent to execute in a respective computing device of the data center based upon instructions received from the designer of the adaptive control system as to an identity of a computing device upon which a customized Agent is intended to execute.

\* \* \* \* \*